April 13, 1954        N. FELICI        2,675,516

HIGH-VOLTAGE ELECTROSTATIC GENERATOR MACHINE

Filed Oct. 2, 1951        8 Sheets-Sheet 1

INVENTOR
Noël Felici
By
George H. Corey
ATTORNEY

Fig. 2

April 13, 1954   N. FELICI   2,675,516
HIGH-VOLTAGE ELECTROSTATIC GENERATOR MACHINE
Filed Oct. 2, 1951   8 Sheets-Sheet 3

INVENTOR
Noël Felici
By
George H. Corey
ATTORNEY

April 13, 1954 N. FELICI 2,675,516
HIGH-VOLTAGE ELECTROSTATIC GENERATOR MACHINE
Filed Oct. 2, 1951 8 Sheets-Sheet 7

Fig. 7a

INVENTOR
Noël Felici
By
ATTORNEY

April 13, 1954  N. FELICI  2,675,516
HIGH-VOLTAGE ELECTROSTATIC GENERATOR MACHINE
Filed Oct. 2, 1951  8 Sheets-Sheet 8

INVENTOR
Noël Felici
By George H. Corey
ATTORNEY

Patented Apr. 13, 1954

2,675,516

UNITED STATES PATENT OFFICE 2,675,516

HIGH-VOLTAGE ELECTROSTATIC GENERATOR MACHINE

Noël Felici, Grenoble, France, assignor to Centre National de la Recherche Scientifique, Paris, France, a corporation of France Application October 2, 1951, Serial No. 249,231

Claims priority, application France October 9, 1950

21 Claims. (Cl. 322—2)

1

The present invention relates to the generation of very high electric voltages by means of electrostatic machines.

For producing very high direct current voltages, as high as several hundreds or thousands of kilovolts, use has been made heretofore of kenotron rectifiers or of electrostatic machines with conveyors of insulating material of the so-called "belt type" operating in a gas under pressure. The former are extremely bulky and costly, and the latter have a very limited output. The power output of an electrostatic machine theoretically increases as the square of the dielectric strength of the fluid medium in which it operates because the maximum current and voltage it can generate theoretically are proportional to the dielectric strength of the medium. This is not the case, however, in machines with conveyors of insulating material. The increase in dielectric strength has an important effect on the density of the electric charge carried by the conveyor and consequently on the current value but this effect is greatly inferior in practice to what theory would indicate. The adherence of charges to the conveyors is not sufficient and for high density of charges creeping discharges through leakage of electricity occur easily, a phenomenon which is not prevented by an increase in the dielectric strength of the medium. Increase of voltage particularly facilitates leakage of electricity so that the voltage and current cannot both increase proportionally in relation to the dielectric strength in accordance with theory. Machines with conveyors of insulating material capable of supplying very high voltages seem, therefore, in the present state of the art, incapable of providing large power output per unit of volume or weight.

On the other hand, the force exerted per unit area of an electrified conductive conveyor may be made exactly proportional to the square of the electric field. It has thus been possible to obtain in this manner a considerable multiplication of the power delivered by machines of the conductive conveyor type. However, the maximum voltages which can be delivered by these machines still remains very much less than those which can be reached with belt type machines.

A first idea was to merely associate, in series, machines of the conductive conveyor type capable of delivering a large output while driving them by means of a common mechanical device or by individual electric motors supplied from the same power supply. Experience shows that such a set up alone does not work to advantage.

2

The object of the present invention is an electrostatic machine capable of delivering very high voltages with an output very much greater than present belt-type machines and of a much simpler and sturdier construction than such machines.

The generating machine in accordance with the invention comprises fundamentally several assemblies or units, juxtaposed, each one of them comprising a rotor provided with one or more conductive conveyor members and a stator provided with one or more inductor members, the conveying member or members being connected to conductive sectors cooperating with fixed brushes respectively connected with an input pole and an output pole of the unit considered, the output pole of one unit being connected with the input pole of the following unit, the input pole of the first unit and the output pole of the last unit constituting the terminals of the machine, and the first unit being arranged to be excited by an internal voltage supply, while the other unit or units are arranged to be excited by at least one of the other units of the machine.

The potentials to which the inductors of each unit are raised with respect to the conveyors of the unit must be suitably stepped from the first to the last unit between the potentials of the two extreme terminals of the machine.

For this purpose, one may either arrange for the inductors of one unit to be connected to the input pole of the preceding unit or to connect the inductors of all units to gradient taps of a voltage divider connected to the terminals of the machine and so arranged that the potentials of the inductor or inductors of the various units will be regularly spaced between the potentials of the machine terminals.

The invention is described in greater detail hereinafter with the reference to the accompanying drawings in which.

Figure 1:
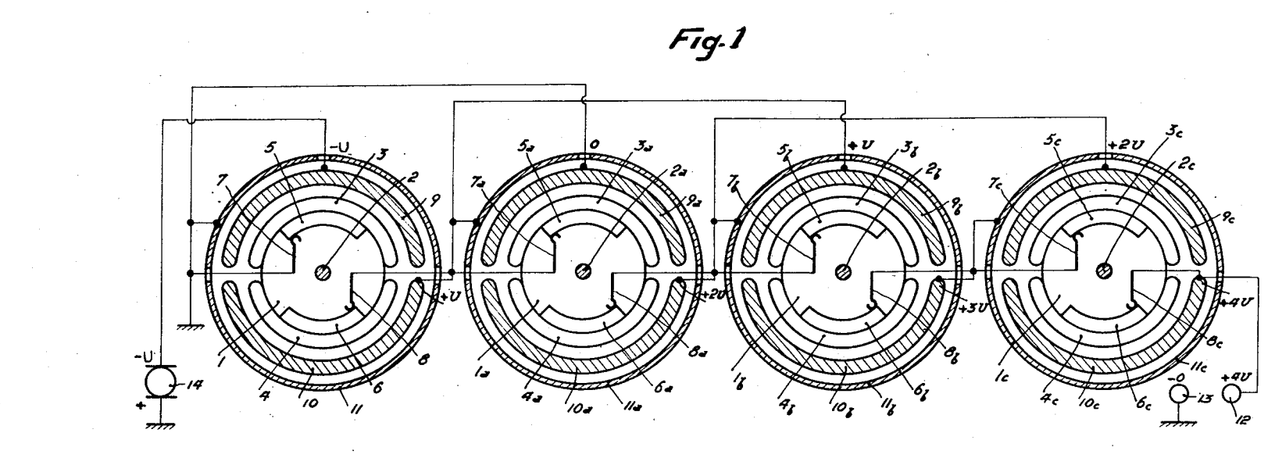
Fig. 1 is an arrangement diagram of a first embodiment of a machine in accordance with the invention.
Figure 2:
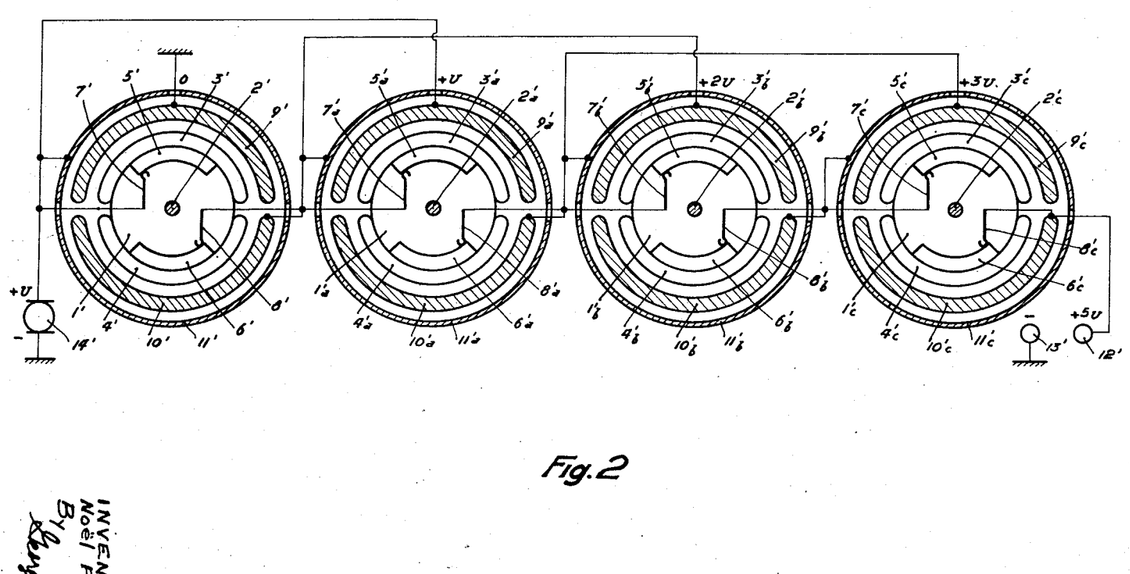
Fig. 2 is a similar diagram of a modification thereof.
Figure 4:
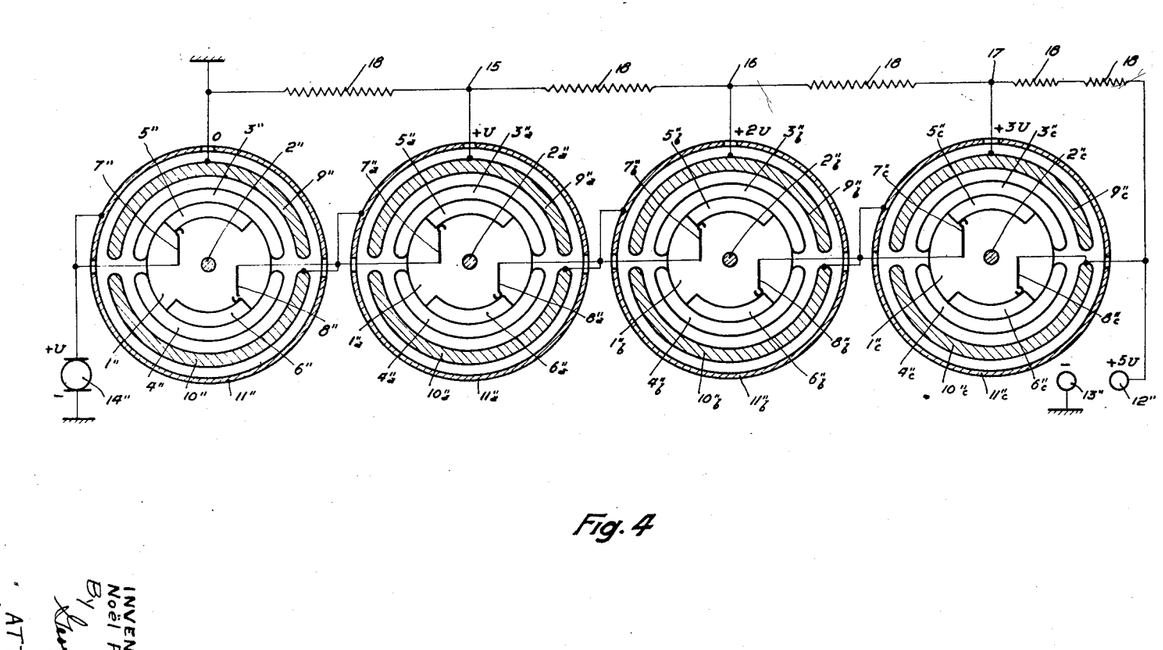
Fig. 4 is an arrangement diagram of another modification of the embodiment of a machine in accordance with the invention utilizing a voltage divider.

In the diagrams of Figs. 1, 2 and 4 the units of the machine have been shown, for clearness sake, side by side while, actually, the preferable solution consists in arranging all of the rotors end to end on one shaft, the stators being arranged correspondingly.

In each one of these diagrams which relate to machines comprising four units the corresponding members of the various units have been designated by the same reference numerals, with indices $a$ for the second unit, $b$ for the third one and $c$ for the fourth one. The same reference numerals have also been assigned to the same members in Figs. 1, 2 and 4, with an index (') for Fig. 2 and ('') for Fig. 4.

In the embodiments shown in Figs. 1, 2 and 4 the generating machine according to the invention comprises four units, each unit consisting of a rotor constituted by an insulating cylindical core 1 keyed on a shaft 2 common to all units each core carrying two conveyor members 3 and 4 formed by thick cylinder segments of conductive material. The conveyors 3 and 4 respectively are connected electrically with contact sectors 5 and 6 which cooperate with fixed brushes 7 and 8. A stator consisting of an inductor member 9 and a shield inductor 10, both formed by thick, conductive cylindrical segments, cooperates with the rotor of each unit. Each unit, thus constituted, is further surrounded by a protecting shield 11 provided by a continuous, cylindrical metal casing. The whole machine is enclosed in a sealed conductive external casing, not shown in Figs. 1, 2 and 4, making it possible to have the units operate in a medium of high dielectric strength, such as a gas under high pressure, this external casing constituting the ground or being connected ground.

The angular position of the brushes 7 and 8 and the angular extent of the sectors 5 and 6 are such that during the rotation of the rotors the contact between one sector and one brush 7 is established when the conveyor corresponding to this sector is already partly in face to face inductive relation to an inductor 9 and this contact is broken at the time when the conveyor begins to pass out of full face to face inductive relation to this inductor. The contact between a sector and the brush 8 is established when the corresponding conveyor is similarly partly in face to face inductive relation to an inductor shield 10 and is broken when this conveyor begins to move out of full face to face inductive relation to this inductor shield. This position and this extent are determined in an accurate manner so that the contact with a brush 7 or 8 shall be established at the time when the potential difference between the conveyor and brush considered is as close to zero as possible and the position of the brushes may be made adjustable to obtain the best conditions for establishing and breaking the contacts and for transferring the charge.

In the machines represented in Figs. 1, 2 and 4 and in accordance with the invention the brush 8, 8', 8'' of the first unit is connected with the brush 7a, 7'a, 7''a of the second one, the brush 8a, 8'a, 8''a of the second unit is connected with the brush 7b, 7'b, 7''b of the third one and the brush 8b, 8'b, 8''b of the third unit is connected with the brush 7c, 7'c, 7''c of the fourth unit.

The brush 7, 7', 7'' of the first unit of each machine is connected to the ground, directly or indirectly as set forth hereinafter, while the brush 8c, 8'c, 8''c of the fourth unit is connected with one terminal 12 of the machine, the other terminal 13 being grounded.

The protecting shields 11, 11a, 11b, 11c of each unit are connected with the brushes 7, 7a, 7b, 7c of the unit considered, Fig. 1, and similarly in Figs. 2 and 4.

In the example shown in Fig. 1, the brush 7 of the first unit is connected directly to the ground. The inductor 9 of this unit is connected with the negative terminal of a voltage supply 14 capable of raising this inductor to a potential $-U$ with respect to the ground to which the other terminal of this supply is connected. The inductor 9a of the second unit is connected to the ground and to the brush 7 of the first unit. The inductor 9b of the third unit is connected with the brush 8 of the first unit and with the brush 7a of the second unit. The inductor 9c of the fourth unit is connected with the brush 8a of the second unit and with the brush 7b of the third unit.

When the shaft 2 is driven in rotation in the direction of the arrows in Fig. 1, the inductor 9 of the first unit maintained at potential $-U$ successively induces on the conveyors 3 and 4, in a manner known per se, electric charges. From the moment when they begin to move out of full face to face inductive relation with inductor 9 the potential of the conveyors 3, 4 increases from the initial potential O to the potential $+U$, the connection of the sectors 5, 6 to brush 7 being broken. When the sectors 5, 6 come into contact with the brush 8 the corresponding conveyors discharge to the circuit connected with this brush, the discharge being facilitated by the presence of the shield inductor 10 at potential $+U$.

The brush 7a of the second unit is thus raised to a potential $+U$ and the conveyors of the second unit, which are under the influence of the inductor 9a at a potential O, as they move out of full face to face relation to inductor 9a are raised gradually to a potential $+2U$ to discharge to the circuit connected with the brush 8a when the sector 5a, 6a engage brush 8a. Similarly, the brush 8b of the third unit receives from the conveyors of the third unit influenced by the inductor 9b raised to a potential $+U$, by connection to brush 8 of the first unit, charges at a potential $+3U$ and, finally, the third and fourth units cooperating in a similar manner, the terminal 12 is raised to the potential $+4U$.

It will be seen that a potential difference of $4U$ is available across the terminals while no unit is required to supply a voltage increase higher than U and the difference of potential between the conveyor and its inductor in each unit is never higher than 2U. Each unit is excited by the previous one, which reduces to one only the number of external exciters necessary and ensures a perfect stability to the entire unit. This would not be the case if the units had simply been associated by connecting their brushes in series and providing an independent excitation for each unit.

The assembly operates in the manner described whatever may be the characteristics of the outer circuit. There are, however, optimum operating conditions from which one should not deviate excessively. It will be realized that, for optimum conditions, all units should give the same voltage increase. That is to say, the difference of potential between the brushes of each unit should be the same for the several units. Since this voltage increase at the same time provides an excitation potential difference for another unit, all units should have the same output voltage increase and should receive the same excitation potential difference. This implies that each unit reaches, individually, its specific optimum condition when its output voltage increase is equal to its excitation potential difference. This condition generally may be substantially realized in machines of the Toepler type. However, it may not always be secured in all machines and in such machines it is possible to provide a remedy in the usual case where the excitation potential difference is lower than the output voltage increase. If U is the output voltage increase and $U/\rho$ the excitation potential difference, $\rho$ being the ratio of the output voltage increase to the excitation potential difference, there may be inserted, for instance between the brushes 7, 8 of the first unit, Fig. 10, a resistor type voltage divider 20, the inductor 9a of the second unit being connected with the tap of the divider which is at a potential $$U\left(1-\frac{1}{\rho}\right)$$

Figure 10:
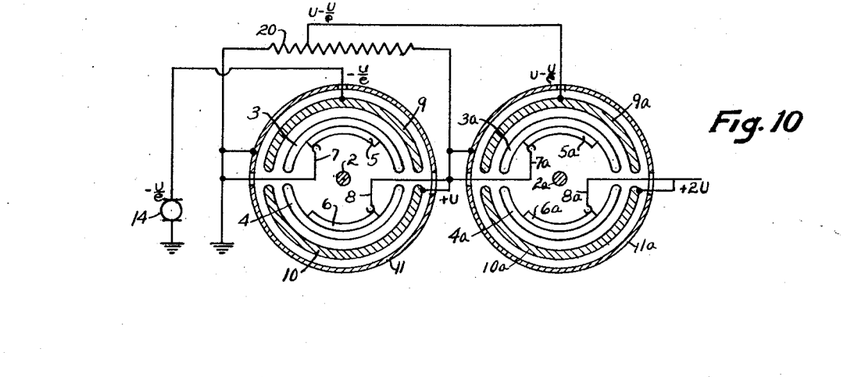
Fig. 10 is a further modification utilizing a voltage divider.

The same arrangement may be made for the other units. The resistor type divider may be replaced by an auxiliary brush arranged with the required angular spacing with respect to and between the brushes 7 and 8 and connected to the inductor 9a.

The provision of the protecting shield 11, which instead of being connected to the brush 7 might be connected to any other point of the machine having a definite potential, makes it possible to avoid the parasitic influence of the capacities of the members of each unit with respect to the ground or to the other units. The production of intense electric fields is also prevented that are caused by high potential differences between the various parts of the machine or between these various parts and the ground. The shapes given to this shield may be adapted in a known manner to avoid any risk of a discharge to the frame of the machine or to the earth.

In the embodiment of Fig. 1 the external voltage supply 14 delivers practically no current, its function being solely to maintain the inductor 9 at the potential −U. An arrangement may be provided, however, such that the voltage at the terminals of this source is added to that of the series of units constituting the machine. In such a case, the exciter is required to deliver a current equal to that of the machine. This is shown in Fig. 2 in which the voltage source 14' consisting, for example, of an electrostatic generator of a type known per se capable of supplying a potential +U with respect to the ground is arranged with its +U potential terminal connected to the brush 7' of the first unit, while the other terminal of the generator 14' is connected to the ground. The inductor 9' of the first unit is then also connected to the ground. This creates between the inductor 9' and the conveyors of the first unit, as long as the sectors 5' and 6' are in contact with the brush 7', the required difference of potential +U. The inductors 9'a, 9'b and 9'c of the other units being respectively connected, as in the case of Fig. 1, to the brushes 7', 7'a and 7'b, the successive units deliver respectively the potentials +2U; +3U, +4U and +5U, the voltage available between the terminals 12' and 13' being consequently 5U for the optimum operating conditions.

Whatever may be the arrangement adopted for excitation, the distribution of the potentials in the series of units depends, for a given excitation potential difference, on the resistance of the receiver or load, "resistance" being the ratio of output potential difference to current. If this resistance has a certain optimum value, which will be called "characteristic resistance," by analogy with the filter-theory, all units give the same voltage increase U and the series will give $nU$ if it comprises $n$ units, taking into account the external excitation generator as in the case of Fig. 2. If the receiver or load resistance is lower than the characteristic resistance, the distribution of potentials and of voltage increase is modified, the last units delivering a voltage increase less than U. It may occur also that the voltage change effected in certain units is reversed to effect a decrease instead of an increase. If, on the other hand, the load resistance is higher than the characteristic value, the last generators generate a higher voltage increase than the first ones.

Figure 3:
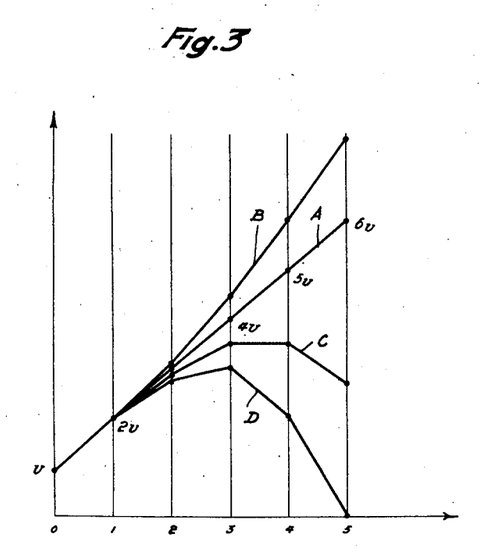
Fig. 3 is a diagram representing the voltage supplied respectively by the various units of a machine, such as those shown in Figs. 1 and 2, as a function of the resistance of the circuit supplied by said machine.

The variations in the potential distribution are represented in the diagram of Fig. 3 which relates to a machine arranged as shown in Fig. 2 but comprising five units. In this diagram the potentials with respect to ground delivered at the output terminal of each unit are plotted as ordinates while the rank of the units, the exciter being of rank zero, is plotted as abscissae. The straight line A represents the distribution of the potentials of the brushes 8, 8a, 8b, 8c, 8d of the units in the series when the load resistance is equal to the characteristic resistance. Curve B relates to the potential distribution for the case of a load resistance higher than this characteristic resistance and curves C and D relate respectively to the case of a load resistance lower than the characteristic resistance and to the case of zero load resistance or a short-circuit across the terminals of the machine. While in the case of curve A the distribution of potential is linear, it will be seen that in the case of curve B the last units supply a higher voltage than the first ones. For a low or zero load resistance, curves C and D, the polarities of the last units of the series are reversed. It also will be noted that for the first units the curves are almost identical. This property would be strictly true in the absence of parasitic capacities. An absolutely constant delivery voltage of 5U then would be obtained in the next to the last unit and, in the last one, the voltage would jump from this value to the voltage determined by the load resistance and the current delivered. Fortunately this circumstance is impossible and the parasitic capacities prevent the last unit from being subjected to such high increase or decrease, in the case of a short circuit or zero load resistance for instance. Nevertheless, the last unit may always be subjected to a high reverse voltage if the series comprises many units, ten for example.

The machine in accordance with the invention is thus ideally utilized only if the load resistance is equal to the characteristic resistance. It is necessary, therefore, to take certain precautions and particularly in the case of a machine to be used under zero load resistance or short-circuited conditions, for charging condensers, for instance, where it may be shown that an instantaneous short circuit is developed on starting the charging of the condenser. It is advantageous to provide spark gaps inserted between the brushes of the last units so as to limit the potential difference to which they may be subjected and thus avoid reaching abnormally high potential differences which would be liable to cause breakdown of the insulation.

When, due to the effect of the delivery through a load resistance very much lower than the characteristic resistance, the voltage in the last units has been reversed, part of the energy supplied by the first machines is used for operating the last ones as motors and is recovered but another part is dissipated in sparks at the collectors or between conveyors and inductors, and its only effect is to damage the equipment.

All the above mentioned drawbacks have a practical importance which depends largely on the particular case contemplated. These drawbacks are all the more troublesome according as the machines are of greater power output, stray capacities are smaller and the number of units are larger and when the service requires frequent operation on a resistance very different from the characteristic resistance, for charging condensers for instance.

For low power machines, of the order of 10 watts for instance, there is no great difficulty in utilizing a series of five or even ten units. On the other hand, for 1000 watt machines, for instance, short-circuited operation such as occurs at the beginning of the charging of a condenser may prove very dangerous even for a series of five units only.

To overcome this drawback a particular method for exciting the units other than the first one may be used. Such a machine has been shown in Fig. 4.

In this machine, as in the case of Fig. 2, the voltage source 14″ is connected to the brush 7″ of the first unit. The inductors 9″a, 9″b, 9″c, however, are connected to points 15, 16 and 17 spaced on a resistor type voltage divider connected across the terminal 12″ of the machine and the ground. The resistor sections 18 composing this divider are all equal and are so arranged that, the terminal 12″ being at a potential +5U, the inductors 9″a, 9″b, 9″c, are respectively raised to potentials U, 2U and 3U, the inductor 9″ being connected to ground.

Figure 5:
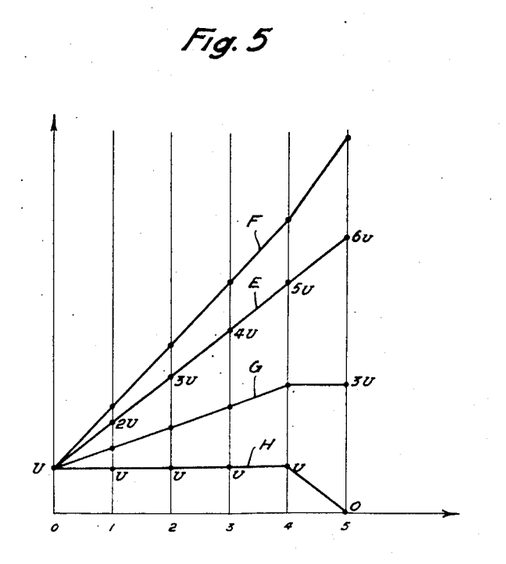
Fig. 5 is a diagram similar to that of Fig. 3 and relative to the machine shown in Fig. 4.

Fig. 5 is a diagram showing distribution of the potentials of the brushes 8″, 8″a, 8″b, 8″c of the various units of Fig. 4, the curves E, F, G, H of this diagram corresponding respectively to the curves A, B, C, D of Fig. 3. For the characteristic resistance and higher load resistance the distribution is of the same character as before.

On the other hand, for low load resistances, (curves G and H) the result is quite different. The distribution and voltage increase remain linear up to the last but one unit. For the last unit only conditions are different. The voltage polarity of the last unit, however, is seldom reversed and, if reversed, this reversed voltage does not exceed U under short circuit conditions whatever may be the number of units in the series. Conditions are thus much more favorable than in the previous set-up when the number of units is large or the series must operate on a load resistance very different from the characteristic resistance. On the other hand, the construction utilizing the voltage divider, which may be of the resistor or glow-discharge type, makes the construction of the machine more expensive. Thus the two excitation methods each have their fields of application, one being simpler and more convenient for low power machines or low number of units in the series and the other one more complicated and favorable for powerful apparatus.

In practice, a machine in accordance with the invention is preferably built in such a manner that the units are arranged vertically one above the other in a column, the first unit which operates at the lowest potential being at the bottom of the column. This arrangement considerably facilitates resolving the insulation problems.

Figure 6:
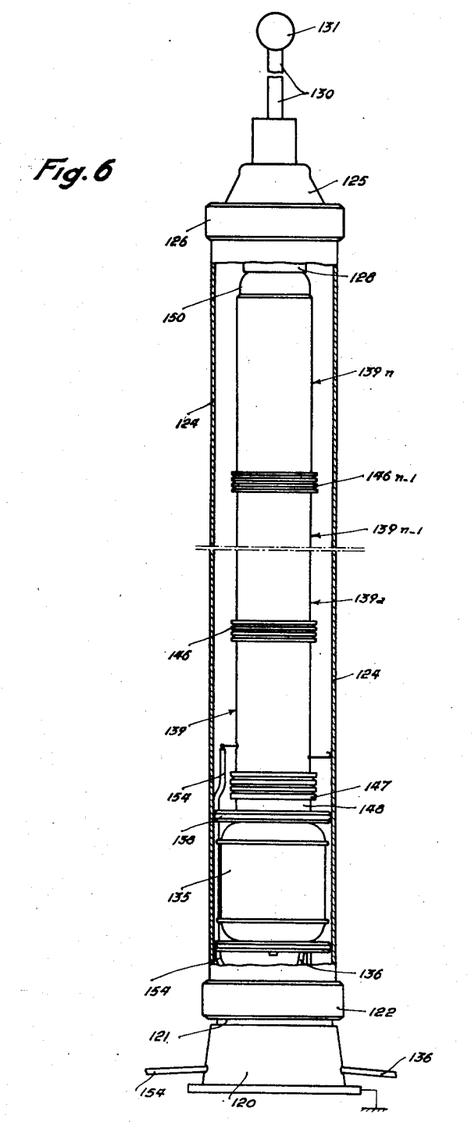
Fig. 6 is an elevational view of an embodiment of a machine in accordance with the invention, the outer casing of this machine being broken away.
Figure 7:
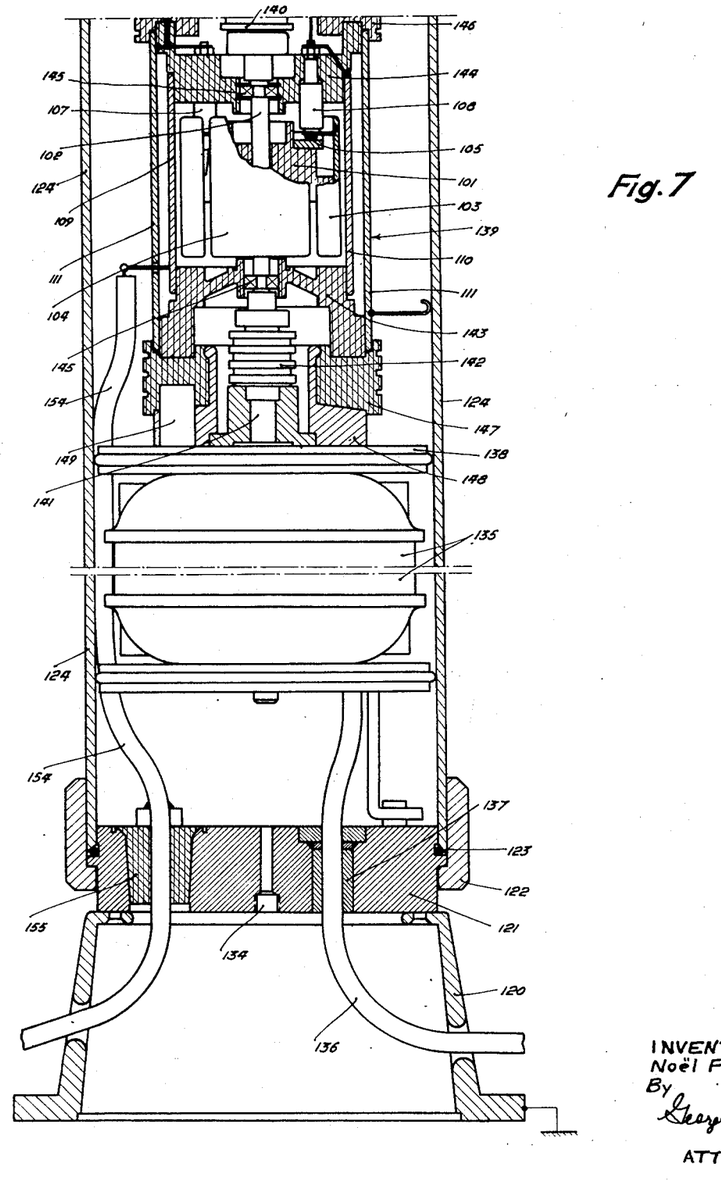
Figs. 7 and 7a are fragmentary views, in vertical section and to a larger scale, of the machine shown in Fig. 6.
Figure 7A:
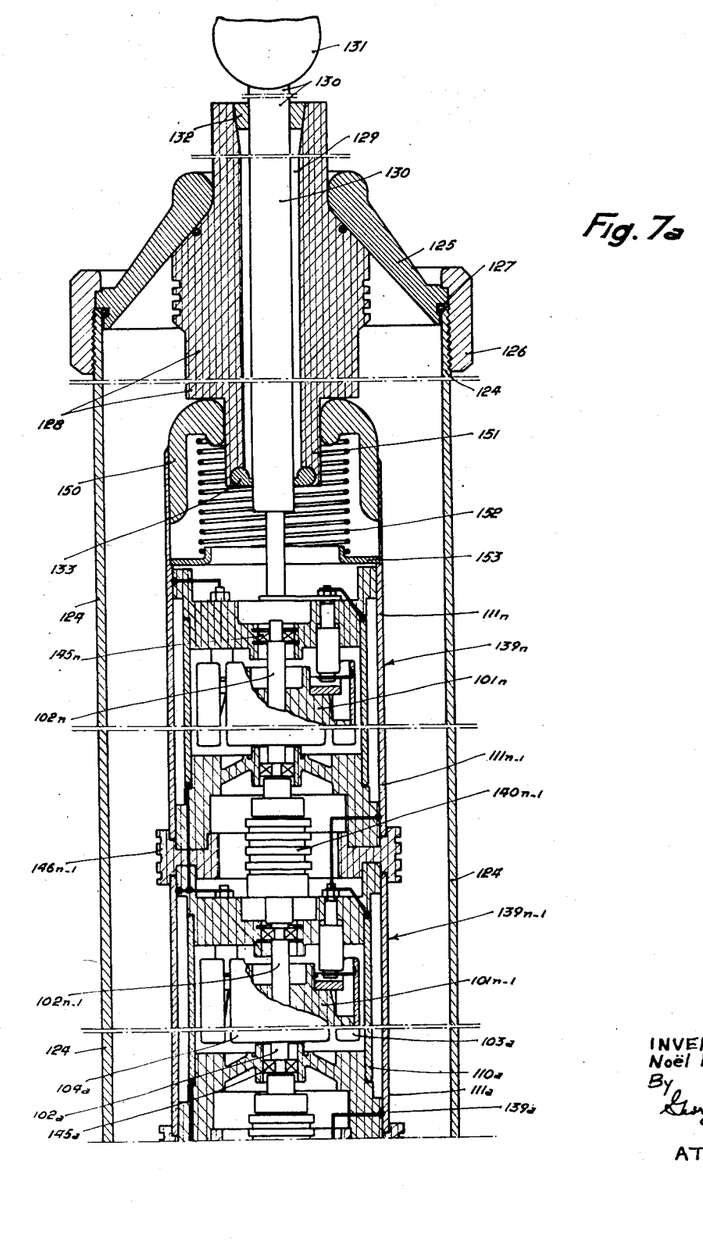

An example of a practical embodiment of a machine arranged in this manner is shown in Figs. 6, 7 and 7a. In these figures, for designating the component elements of the various units of the generating machine, reference numerals corresponding to those of Figs. 1, 2 and 4 have been used increased by 100. This machine comprises a base 120 supporting a cylindrical base member 121 on which is secured by means of a clamping ring 122 and a gasket joint 123 so as to be airtight the external casing of the machine consisting of a metal tube 124. This casing is closed at its upper portion by a cap 125 clamped on said tube air-tight by means of a ring 126 with the interposition of a gasket 127. The cap 125 carries centrally thereof in air-tight relation thereto an insulating part 128 provided with an axial bore 129 through which passes a conductive rod 130 terminating at its upper end in a ball 131. The bore 129 is closed at its two ends by gaskets 132 and 133. A valve, the housing of which 134 only has been represented, is arranged in an opening in the base member 121, this valve making it possible to fill the casing 124 with a gas under pressure, for instance air, under a pressure higher than 20 atmospheres.

Inside the casing 124 and supported on the base member 121 a motor 135 is disposed for driving the generator proper, this motor being supplied by a conductor 136 passing through and sealed at 137 to the base member 121. Above the motor 135 is placed a separating plate 138 on which rest the units 139, 139a, ... 139n—1, 139n constituting the generator, the units being arranged vertically end to end. The common shaft carrying the rotors 101, 101a ... 101n—1, 101n of the various units consists of shaft sections 102, 102a ... 102n—1, 102n connected together by insulating couplings 140 ... 140n. The shaft section 102 corresponding to the first unit itself is connected with the shaft 141 of the motor by an insulating coupling 142 identical with the couplings 140 ... 140n.

Each unit 139, 139a ... 139n comprises an insulating rotor core 101, 101a ... 101n carrying conveyors 103, 104 ... 103n, 104n. Each one of the conveyors is connected electrically to a conducting segment such as 105, carried by the corresponding insulating core, these segments forming for each unit, a collector which cooperates with two brushes 107 and 108 ... 107n and 108n.

The stator of each unit is constituted by an inductor 109, 109a etc. and a shield inductor 110, 110a etc., each one extending over an arc about the axis of rotation of slightly less than 180°. The inductor 109 and the shield inductor 110 in each unit are supported by two insulating flanges 143 and 144 on which also are supported the brushes 107 and 108. These flanges also support the protecting shields 111, 111a ... 111n each consisting of a metal cylinder. The flanges 143 and 144 are bored axially and each carries a ball bearing 145 supporting the corresponding shaft section 102, 102a ... 102n.

The units thus constituted are stacked up vertically with interposition of an insulating junction ring such as 146 ... 146n, between each two units. The first unit is supported on the separating plate 138 bearing on an insulating ring 147 carried on a sleeve 148 centered on the axis of the shafts 102, 102a ... 102n by means of shims 149. On the other hand, in the upper portion of the protecting shield 111n of the last unit an insulating cover 150 is disposed, this cover being bored axially and fitting on a downward extension 151 of the part 128 with a light friction. A helical compression spring 152 bearing at one end on the under side of the cover and at the other end on an annular disc 153 resting on a shoulder provided in the protective shield 111n holds the stack of units in position by clamping them against one another and against the motor frame 135 when the cap 125 is secured in place.

As regards electrical connections, the machine represented in Figs. 7, 7a is set up in accordance with the diagram of Fig. 1. The inductor 109 is connected to an external voltage supply through a conductor 154 passing through the base member 121 and sealed thereto by an airtight joint 155. The protecting shield 111 of the first unit is connected as by connection 170 with the ground constituted by the casing 124 which may be connected to the earth. The brush 107 of each unit is connected, on the one hand, to the protecting shield 111 of the unit to which it belongs, and, on the other hand, to the inductor 109 of the next unit. The brush 108 of each unit is connected, on the one hand, to the shield inductor 110 of the unit to which it belongs and, on the other hand, to the protecting shield 111 of the next unit. Thus, the brush 108 of each unit is connected to the brush 107 of the next unit through the protecting shield 111 of this next unit. As to the brush 108n of the last unit it is connected, on the one hand, to the shield inductor 110n of the last unit as previously indicated and, on the other hand, it is connected by strap 172 to the rod 130 terminating in the ball 131 which constitutes one terminal of the machine, the other terminal being constituted by the casing 124 itself which may be connected to ground.

A machine constituted as just described comprising four units 139, 139a, 139b, 139c in which the inductor 109 of the first unit was connected with an excitation source capable of raising the inductor to a potential of 70,000 volts relative to ground was capable of delivering at its terminal an output potential difference of 280,000 volts with a current of 0.2 milliamp., each unit operating to produce a voltage increase of 70,000 volts.

In conventional machines for high output voltages, for instance about 200 kv., the high voltage output becomes difficult to obtain owing to the fact that the size of the machine increases considerably and that high voltage is difficult to insulate. To obtain a sufficient insulation, one is led to increase considerably the diameter of the metal casing.

The embodiment hereafter described is for the purpose of avoiding these drawbacks by providing an electrostatic machine such as that described above provided with an insulating material casing made of "haelyte," for instance. Such a construction allows a very substantial saving in the height and diameter of these machines while eliminating the high voltage outlet opening, which makes it possible for the outside leakage path to be equal to the length of the casing and consequently always sufficient and automatically always proportional to the number of generating elements stacked up. Such a machine is shown in greater detail in Figs. 8 and 9.

Figure 8:
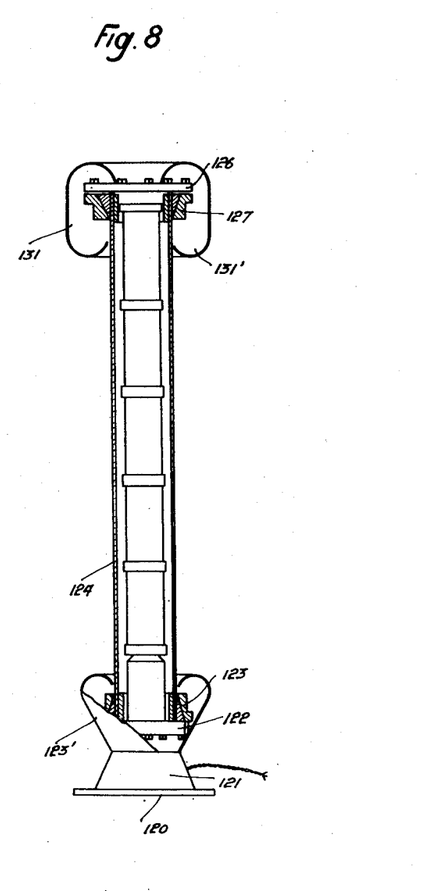
Fig. 8 is an elevational view of a modification of a machine in accordance with the invention and provided with a casing of insulating material and wherein passing the high voltage terminal through the casing is eliminated.

In the machine illustrated in Fig. 8 a base 120 supports a conical base member 121 on which is secured, by means of a clamping ring 122 and a gasket joint 123 so as to be air-tight, the outer casing of the machine consisting of a tube of insulating material 124'. An auxiliary outer envelope 123' surrounds the lower portion of the insulating casing 124'. The casing 124' is formed at its upper portion in the same manner as at its lower portion with a clamping ring 126 cooperating with a joint 127. Such a set-up makes it possible to omit the insulating part 128 provided with an axial bore through which passes a conducting rod terminating at its upper portion in a ball 131 as in Fig. 7a.

In Fig. 8 the upper terminal of the machine is formed as a hollow torus 131' of conductive material electrically connected by connector 160 to the output terminal of the last generating unit 139₅.

Figure 9:
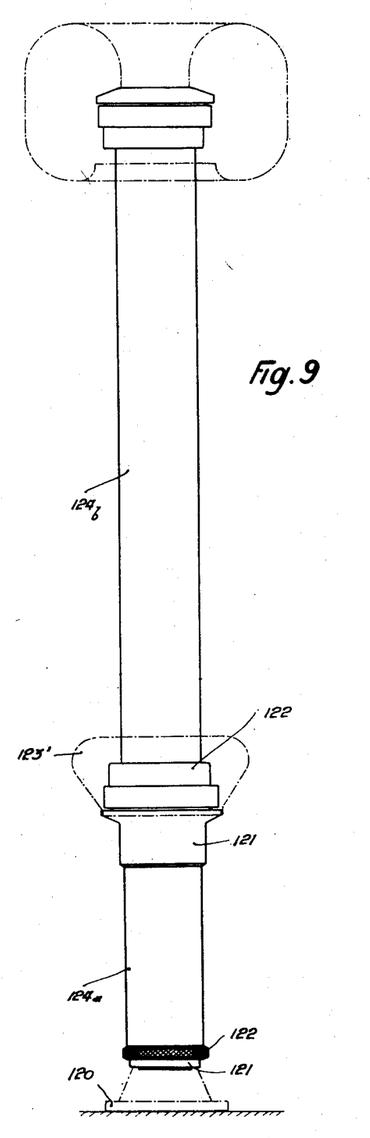
Fig. 9 is another embodiment of the machine with a casing having a metal base extended by an insulating casing.

Figure 9 shows a different embodiment in which the casing consists of two portions, a first metal portion 124a enclosing the motor and at least the first generating unit and an insulating portion 124b containing all other units.

The purpose of this arrangement is to facilitate the cooling of the motor and the dissipation of heat to the outside. The driving motor, together with at least the first generating unit in the cascade which is still at a limited potential, are arranged inside the metal casing which is a good heat conductor. The length of the insulating casing the thermal conductivity of which is low is determined so as:

(1) To contain the generating units beginning with the one the potential of which would be incompatible with proximity to a metal casing;

(2) To have a sufficiently long outer leakage path for maintaining the total potential difference without any risk of breakdown discharge or creeping discharges along the tube.

In the above description the machines are represented and described as comprising conveyor members and inductor members consisting of cylindrical segments. It will be understood that the invention applies in the same manner to machines in which these members consist of segments of plates arranged in a plane perpendicular to the shaft of the machine or of members in the shape of bars arranged parallel with or perpendicular to said shaft.

What I claim is:

1. An electrostatic influence generator comprising a plurality of generating units each having a conductive inductor member and a conductive carrier member, said inductor members and said carrier members being supported in the respective generating units for movement thereof one relative to the other into and out of inductive relation to each other, said inductor member in a given unit being maintained at a predetermined potential, each unit having an output terminal and an input terminal, means for connecting the respective carrier members to the respective output terminals at a selected point in said relative movement of said carrier members and the corresponding inductor members out of full inductive relation to each other so as to deliver the electrostatic charges to the respective output terminals, means for connecting the respective carrier members to the respective input terminals at a selected point in said relative movement of said carrier members and the corresponding inductor members into inductive relation to each other to determine for a predetermined movement of said carrier members into said inductive relation to said inductors the potentials of said carrier members respectively at the potentials of said input terminals, the output terminal of said given unit being connected to the input terminal of another unit, and means for maintaining the inductor member of said other unit at a predetermined potential higher than the potential of said inductor member of said given unit.

2. An electrostatic influence generator as defined in claim 1 in which the inductor member of said other unit is connected to the input terminal of said given unit to determine the potential of said inductor member of said other unit at a predetermined potential higher than the potential of said inductor member of said given unit.

3. An electrostatic influence generator which comprises a plurality of units each having a rotor, said rotors being supported on a common shaft for rotation therewith on the axis of the shaft, each rotor having a conductive carrier member supported thereon for rotation with said rotor about said axis of said shaft, each unit having a conductive inductor member supported adjacent the path of movement of said carrier member thereof for movement of said carrier member into and out of full face to face inductive relation to said inductor member upon rotation of said shaft, the inductor member of a given unit being maintained at a predetermined potential, each unit having an input terminal and an output terminal, brushes respectively connected to said terminals in each unit and disposed so as to establish electrical connection between the respective conductive carrier members and the corresponding input and output terminals respectively at a selected point in the movement of said carrier members into inductive relation with said inductor members and at a selected point in the movement of said carrier members out of full inductive relation to said inductor members, the output terminal of said given unit being connected to the input terminal of a second unit, and means for maintaining the inductor members of the other units at predetermined potentials progressively higher than the potential of said inductor member of said given unit.

4. An electrostatic influence generator as defined in claim 1 which comprises at least two of said generating units, a voltage divider connected between said inductor member of said given unit and an element of said generator at a potential substantially higher than the potential of said given inductor member, and tap connections from points on said voltage divider of predetermined potentials to the respective inductor members of the units to determine potentials of said inductor members that are progressively higher than the potential of said inductor member of said given unit.

5. An electrostatic influence generator as defined in claim 4 in which said inductor member of said given unit is connected to ground.

6. An electrostatic influence generator as defined in claim 1 which comprises an external voltage supply having one terminal thereof connected to the input terminal of said given unit to establish the potential of said carrier member of said given unit for said predetermined movement of said carrier into inductive relation to said inductor member of said given unit.

7. An electrostatic influence generator as defined in claim 1 which comprises means providing an external source of voltage supply, one terminal of said supply being connected to said inductor member of said given unit and the other terminal of said supply being connected to the input terminal of said given unit.

8. An electrostatic influence generator as defined in claim 1 which comprises an external source of voltage supply, one terminal of said supply at higher potential being connected to the input terminal of said given unit and the other terminal of said supply being connected to the inductor member of said given unit.

9. An electrostatic influence generator as defined in claim 8 in which said other terminal of said supply is connected to ground.

10. An electrostatic influence generator as defined in claim 1 which comprises conductive protecting shields respectively extending about said units, said shields being insulated from each other, and means for maintaining said shields respectively at predetermined potentials.

11. An electrostatic influence generator as defined in claim 10, said protecting shields being respectively connected to the input terminals of corresponding units.

12. An electrostatic influence generator as defined in claim 3 in which said units are disposed in juxtaposed relation to each other along said shaft, a casing enveloping said units and capable of confining therein a fluid under pressure to provide a dielectric medium within which the elements of said units at different potentials are disposed.

13. An electrostatic influence generator as defined in claim 12 in which at least a part of said casing is of metallic material, and a driving motor supported within said metallic casing and operatively connected to said shaft for rotatably driving said shaft and said rotors supported thereon.

14. An electrostatic influence generator as defined in claim 3 in which said units are disposed in juxtaposed relation to each other along said shaft, a casing enveloping said units and capable of confining therein a fluid under pressure to provide a dielectric medium within which the elements of said units at different potentials are disposed, said casing having at least a section thereof along the axis of said shaft made of insulating material.

15. An electrostatic influence generator as defined in claim 14 in which said insulating material is haelyte.

16. An electrostatic influence generator as defined in claim 3 in which said units are disposed in juxtaposed relation to each other along said shaft, a casing enveloping said units and capable of confining therein a fluid under pressure to provide a dielectric medium within which the elements of said units at different potentials are disposed, said casing having a section of metallic material extending along said shaft enveloping a unit at lower potential and a section of insulating material extending along said shaft and disposed along said shaft from said metallic section and enveloping a unit of higher potential.

17. An electrostatic influence generator as defined in claim 1 which comprises a conductive shield supported in at least one of said generating units for movement thereof and of said carrier member one relative to the other into and out of inductive relation to each other, said shield being supported in spaced relation to said inductor member along the path of said relative movement of said inductor and carrier members, and means connected to said shield for maintaining said shield at a potential higher than the potential of said inductor member.

18. An electrostatic influence generator as defined in claim 3 in which said shaft is supported for rotation thereof and of said rotors thereon on a vertical axis, said units being supported one above the other along said shaft with the unit the output terminal of which is at lowest potential in the lowermost position and the unit the output terminal of which is at highest potential in the uppermost position, and a casing extending about said assembly of said units and capable of confining therein a fluid under pressure to provide a dielectric medium within which the elements of said units at the different potentials are disposed.

19. An electrostatic influence generator as defined in claim 1 in which a resistance is connected between points of predetermined different potentials in a selected unit of said generator, said inductor member of another unit being connected to a tap of intermediate potential on said resistance.

20. An electrostatic influence generator comprising a plurality of generating units each having a conductive inductor member and a conductive carrier member, said inductor members and said carrier members being supported in the respective generating units for movement thereof one relative to the other into and out of inductive relation to each other, said inductor member in a given unit being maintained at a predetermined potential, each unit having an output terminal and an input terminal, means for connecting the respective carrier members to the respective output terminals at a selected point in said relative movement of said carrier members and the corresponding inductor members out of full inductive relation to each other so as to deliver the electrostatic charges to the respective output terminals, means for connecting the respective carrier members to the respective input terminals at a selected point in said relative movement of said carrier members and the corresponding inductor members into inductive relation to each other to determine for a predetermined movement of said carrier members into said inductive relation to said inductor members the potentials of said carrier members respectively at the potentials of said input terminals, the output terminal of said given unit being connected to the input terminal of another unit, and means connected to said inductor members for maintaining the potential of the inductor member of said other unit lower than the potential of the output terminal of said given unit and higher than said predetermined potential of said inductor member of said given unit.

21. An electrostatic influence generator as defined in claim 20 which comprises means connected to said inductor members for maintaining said inductor members of the respective units at predetermined potentials progressively higher than the potential of said inductor member of said given unit.

References Cited in the file of this patent

UNITED STATES PATENTS

| Number | Name | Date |
|---|---|---|
| 2,486,140 | Felici | Oct. 25, 1949 |
| 2,610,994 | Bosch et al. | Sept. 16, 1952 |